United States Patent
Dickson (10) Patent No.: US 10,625,206 B2
(45) Date of Patent: Apr. 21, 2020

(54) APPARATUS AND METHOD FOR REMOVING MERCURY FROM A GAS

(71) Applicant: Graham Dickson, North Vancouver (CA)

(72) Inventor: Graham Dickson, North Vancouver (CA)

(*) Notice: Subject to any disclaimer, the term of this patent is extended or adjusted under 35 U.S.C. 154(b) by 0 days.

(21) Appl. No.: 15/171,752

(22) Filed: Jun. 2, 2016

(65) Prior Publication Data

US 2016/0317969 A1   Nov. 3, 2016

Related U.S. Application Data (63) Continuation of application No. 14/531,864, filed on Nov. 3, 2014, now abandoned, which is a continuation of application No. 12/841,783, filed on Jul. 22, 2010, now Pat. No. 8,877,148.

(60) Provisional application No. 61/228,503, filed on Jul. 24, 2009.

(51) Int. Cl.
   *B01D 53/78* (2006.01)
   *B01D 53/64* (2006.01)

(52) U.S. Cl.
   CPC .......... *B01D 53/78* (2013.01); *B01D 53/64* (2013.01); *B01D 2251/00* (2013.01); *B01D 2251/108* (2013.01); *B01D 2251/304* (2013.01); *B01D 2251/606* (2013.01); *B01D 2257/602* (2013.01); *B01D 2258/00* (2013.01)

(58) Field of Classification Search
   None
   See application file for complete search history.

(56) References Cited

U.S. PATENT DOCUMENTS

| | | | | |
|---|---|---|---|---|
| 4,640,751 A | * | 2/1987 | Dyvik | B01D 53/64 205/562 |
| 4,859,440 A | * | 8/1989 | Zechner | B01D 53/501 423/240 R |
| 5,409,522 A | * | 4/1995 | Durham | B01D 46/0023 210/650 |
| 5,569,436 A | * | 10/1996 | Lerner | B01D 53/64 110/235 |
| 5,879,948 A | * | 3/1999 | Van Pelt | G01N 33/0045 250/373 |
| 2004/0202596 A1 | * | 10/2004 | Honjo | B01D 53/501 423/210 |

FOREIGN PATENT DOCUMENTS

JP   03056123   * 7/1989

* cited by examiner

*Primary Examiner* — Sheng H Davis
(74) *Attorney, Agent, or Firm* — Benoit & Cote Inc.; France Côté

(57) ABSTRACT

The present invention provides a method and apparatus for removing mercury from gases such as those discharged from roasters and other heat producing systems. In embodiments the method comprises reacting the mercury with dissolved molecular chlorine, and may also comprise reacting the mercury with mercuric chloride to yield mercurous chloride. The mercurous chloride may be removed by precipitation. There are also disclosed apparatuses for implementing the method.

8 Claims, 3 Drawing Sheets

APPARATUS AND METHOD FOR REMOVING MERCURY FROM A GAS

CROSS-REFERENCE TO RELATED APPLICATIONS

This application is a is a continuation of U.S. application Ser. No. 14/531,864, filed Nov. 3, 2014, which is a continuation of U.S. application Ser. No. 12/841,783, filed Jul. 22, 2010, now U.S. Pat. No. 8,877,148, issued Nov. 4, 2014, which claims priority to U.S. Provisional Application No. 61/228,503, filed Jul. 24, 2009, each of which application is herein incorporated by reference for all purposes.

BACKGROUND

Mercury emissions from coal-fired boilers and from other combustion processes, including municipal waste combustors, gold ore roasters, and hazardous waste incinerators have been studied to determine emissions rates and effectiveness of control technologies. Factors that differ between coal-fired boilers and ore roasters may include mercury content of the feed and flue gas, flue gas sulfur dioxide concentration, and flue gas mercury speciation. Analyses of untreated flue gas from coal-fired boilers have detected mercury concentrations up to 25 ug/m$^3$, with an average concentration of 15 ug/m$^3$. Gold ores have measured mercury concentrations from less than 1 mg/kg to 200 mg/kg for ore deposits in the western U.S. It is thus desirable, and in many countries it may be legally required, to remove contaminating mercury from off gases before these are released to the environment.

Studies of treatment technologies for mercury removal from coal-fired boiler emissions have shown that speciation of mercury may impact mercury removals. Mercury species in combustion gases may include elemental mercury vapor ($Hg^0$), oxidized mercury vapor ($Hg^{+2}$) and mercury associated with particulate matter ($Hg^P$). Elemental mercury may be a dominant species in roaster flue gas.

It is thought that the mercury in off gases from ore roasters and the like may be present as water-insoluble elemental mercury (Hg) and water-soluble ionized mercury ($Hg^{2+}$). Although ionized mercury, which is easily absorbed by water, can be removed by a desulfurization absorption tower or the like, elemental mercury, which has a very low solubility in water, may not be absorbed by a desulfurization absorption tower, and may be discharged as elemental mercury vapor without being absorbed.

Conventionally, two major approaches have been proposed for the removal of mercury from gases: an activated carbon adsorption method and a mercuric chloride absorption method in which elemental mercury is converted to mercurous chloride by the reaction with mercuric chloride. However in the foregoing conventional mercuric chloride method, when the mercury having been oxidized once is trapped by a downstream scrubber, it may be reduced by the action of $SO_2$ coexisting in the flue gas, and may be volatized again. The effectiveness of the conventional mercury removal process may be limited by the reaction rate of the mercuric chloride with the elemental mercury.

A variety of methods and apparatuses for the removal of mercury from contaminated gases are well known in the prior art.

U.S. Pat. No. 5,409,522, Apr. 25, 1995 to Durham et al. discloses an apparatus and process for removing particular material and mercury-containing compounds from a gas stream by regenerating the sorbent used to recover the mercury.

U.S. Pat. No. 6,920,329, Nov. 1, 2005 to Sellakumar discloses an apparatus and process for converting mercury to mercuric chloride comprising contacting the mercury with a solution of a chloride salt and heating the solution/

FIELD

The present invention relates to a method and apparatus for removal and recovery of mercury from gases.

SUMMARY

In an embodiment there is disclosed a method for removing mercury from a gas, the method comprising reacting the mercury with dissolved chlorine gas to form mercuric chloride.

In alternative embodiments the chlorine gas and the formed mercuric chloride are in aqueous solution.

In alternative embodiments the solution and the gas may form a gas/liquid interface and the reacting may further comprise forming a 2-dimensional mercury vapour at said gas/liquid interface.

In alternative embodiments the reacting may occur at a temperature of less than about 65° C. or at temperatures of less than about 40° C.

In alternative embodiments the method further comprises the step of reacting any unreacted mercury with the mercuric chloride to form mercurous chloride and may comprise the step of removing the mercurous chloride from the solution.

In alternative embodiments the chlorine solution is at a pH of between about 6.5 and about 7.5 and in embodiments the gas may be an off gas.

In alternative embodiments there is disclosed an apparatus for removing mercury from a gas, wherein the improvement comprises a first mercury scrubber for reacting the mercury with a chlorine solution.

In alternative embodiments the apparatus may comprise a chlorine feed system for regenerating the chlorine solution.

In alternative embodiments the improvement further comprises a second mercury scrubber and a circulation system suitable to substantially continuously recirculate the chlorine solution between the two said scrubbers.

In alternative embodiments the apparatus further comprises a harvester for harvesting precipitated mercurous chloride generated in the scrubber.

In embodiments there is disclosed a method for removing mercury from a gas wherein the improvement comprises reacting the mercury with a solution of chlorine gas to form mercuric chloride in solution.

In alternative embodiments the method comprises reacting the unreacted mercury with the mercuric chloride to form mercurous chloride.

In alternative embodiments the method further comprises the step of removing the mercurous chloride from the solution.

In alternative embodiments the solution and gas form a gas/liquid interface and said reacting further comprises forming a 2-dimensional mercury vapour at said gas/liquid interface.

In alternative embodiments the reaction of mercury with said solution of chlorine gas occurs in a first scrubber and said reaction of mercury with mercuric chloride occurs in a second scrubber.

In alternative embodiments the reacting may occur at a temperature of less than about 65° C. or at temperatures of less than about 40° C.

In alternative embodiments the reaction between the chlorine and the mercury occurs under an ORP of between about 500 mV and about 2000 mV.

In an embodiment there is disclosed a method for removing mercury from a gas wherein the improvement comprises reacting the mercury with chlorine gas to form $HgCl_2$.

In an alternative embodiment there is disclosed a method for removing mercury from a gas wherein the improvement comprises reacting the mercury with chlorine gas to form $HgCl_2$ and wherein the chlorine gas is in aqueous solution. In an alternative embodiment the method further comprises reacting the mercury with the $HgCl_2$ to form $Hg_2Cl_2$.

In an alternative embodiment there is disclosed a method for removing mercury from a gas wherein the improvement comprises reacting the mercury with dissolved chlorine gas.

In an alternative embodiment there is disclosed a method for reacting mercury with chlorine gas wherein the improvement comprises reacting the mercury with the chlorine gas at a gas liquid interface.

In an alternative embodiment there is disclosed mercury scrubber wherein the improvement comprises a reactor for reacting the mercury with a solution of chlorine gas.

In an alternative embodiment there is disclosed an apparatus for removing mercury from a gas wherein the improvement comprises a mercury scrubber for reacting the mercury with a solution of chlorine gas.

In an alternative embodiment there is disclosed an apparatus according to other embodiments wherein the apparatus further comprises a second mercury scrubber for reacting the mercury with a solution of $HgCl_2$ and generating $Hg_2Cl_2$.

The apparatus according other embodiments wherein apparatus comprises a harvester to remove precipitated $Hg_2Cl_2$ from the solution.

In a further embodiment there is disclosed a mercury scrubber wherein the improvement comprises a reactor for reacting the gas to be treated with a chlorine solution and wherein a further improvement comprises precipitating mercurous chloride.

In embodiments the mercury may be elemental mercury.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the subject matter hereof. Accordingly, the drawings and the description are to be regarded as illustrative in nature, and not as restrictive.

DETAILED DESCRIPTION OF EMBODIMENTS

Terms

In this disclosure a mercury scrubber means any device for removing mercury, from a gas.

In this disclosure the terms "off gas" and "flue gas" mean gas released by a process, which may be or may comprise a heating or combustion step and in embodiments may include gases generated by ore roasting processes, coal and oil fired boilers and hazardous waste incinerators.

In this disclosure "mercury" includes elemental mercury.

In this disclosure the term "soda ash" has its normal meaning and means sodium carbonate, which may be in solution or solid, as the context requires. Those skilled in the art will readily store and handle soda ash and will prepare and use suitably concentrated stock solutions.

In this disclosure the term "scrubber solution" means solution to be contacted with gases to be treated to remove mercury therefrom and in embodiments may contain dissolved chlorine, may contain dissolved chloride ions, and may contain a pH adjusting component which may be or may comprise soda ash or equivalents.

In alternative embodiments an ore referred to in this disclosure may be any metal ore including but not limited to ores of metals, which may be heavy metals or precious metals, and may include ores of gold, silver, nickel, iron, zinc, cobalt, manganese, molybdenum, vanadium, tungsten, lead, tin, tantalum, cadmium, arsenic, aluminium, beryllium, bismuth and copper.

In this disclosure the term "gas to be treated" means any gas to be treated to remove mercury, and may be an off gas or flue gas.

In this disclosure the terms "harvester" "precipitator" "precipitation device" and the like all refer to any apparatus or device whereby undissolved chemicals or materials may be removed from a solution or liquid by precipitation. In particular embodiments such apparatuses and methods may be used to remove $Hg_2Cl_2$ (mercurous chloride or calomel) from a solution.

In embodiments gases treated by the methods and apparatuses of embodiments may, after treatment, comprise less than about $10\ \mu g/m^3$, less than about $9\ \mu g/m^3$, less than about $8\ \mu g/m^3$, less than about $7\ \mu g/m^3$, less than about $6\ \mu g/m^3$, less than about $5\ \mu g/m^3$, less than about $4\ \mu g/m^3$, less than about $3\ \mu g/m^3$, less than about $2\ \mu g/m^3$, less than about $1\ \mu g/m^3$, less than about $0.9\ \mu g/m^3$, less than about $0.8\ \mu g/m^3$, less than about $0.7\ \mu g/m^3$, less than about $0.6\ \mu g/m^3$, less than about $0.5\ \mu g/m^3$, less than about $0.4\ \mu g/m^3$, less than about $0.3\ \mu g/m^3$, less than about $0.2\ \mu g/m^3$, less than about $0.1\ \mu g/m^3$, or less than about $0.05\ \mu g/m^3$ of mercury. In particular embodiments the treated gases may contain less than about $6\ \mu g/m^3$ of mercury.

In embodiments particular steps may be repeated, and the apparatuses and methods described may be combined with any other methods and apparatuses for treatment of gases in ways readily apparent to those skilled in the art. Specific concentrations and handling of reagents will be readily understood and modified by those skilled in the art to suit particular requirements.

First Embodiment

Figure 1:
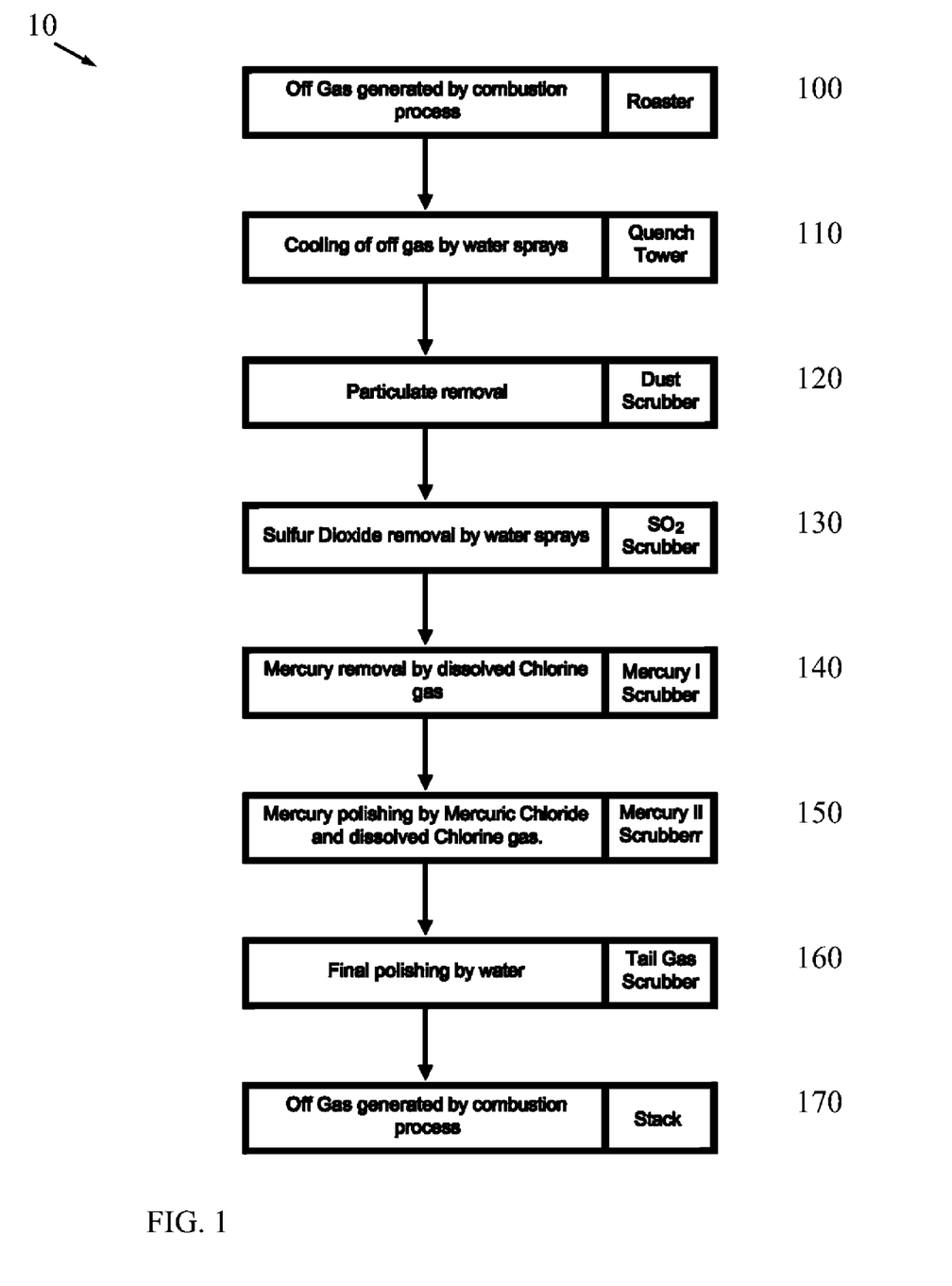
FIG. 1 is a flow diagram showing the steps of an embodiment.
Figure 2:
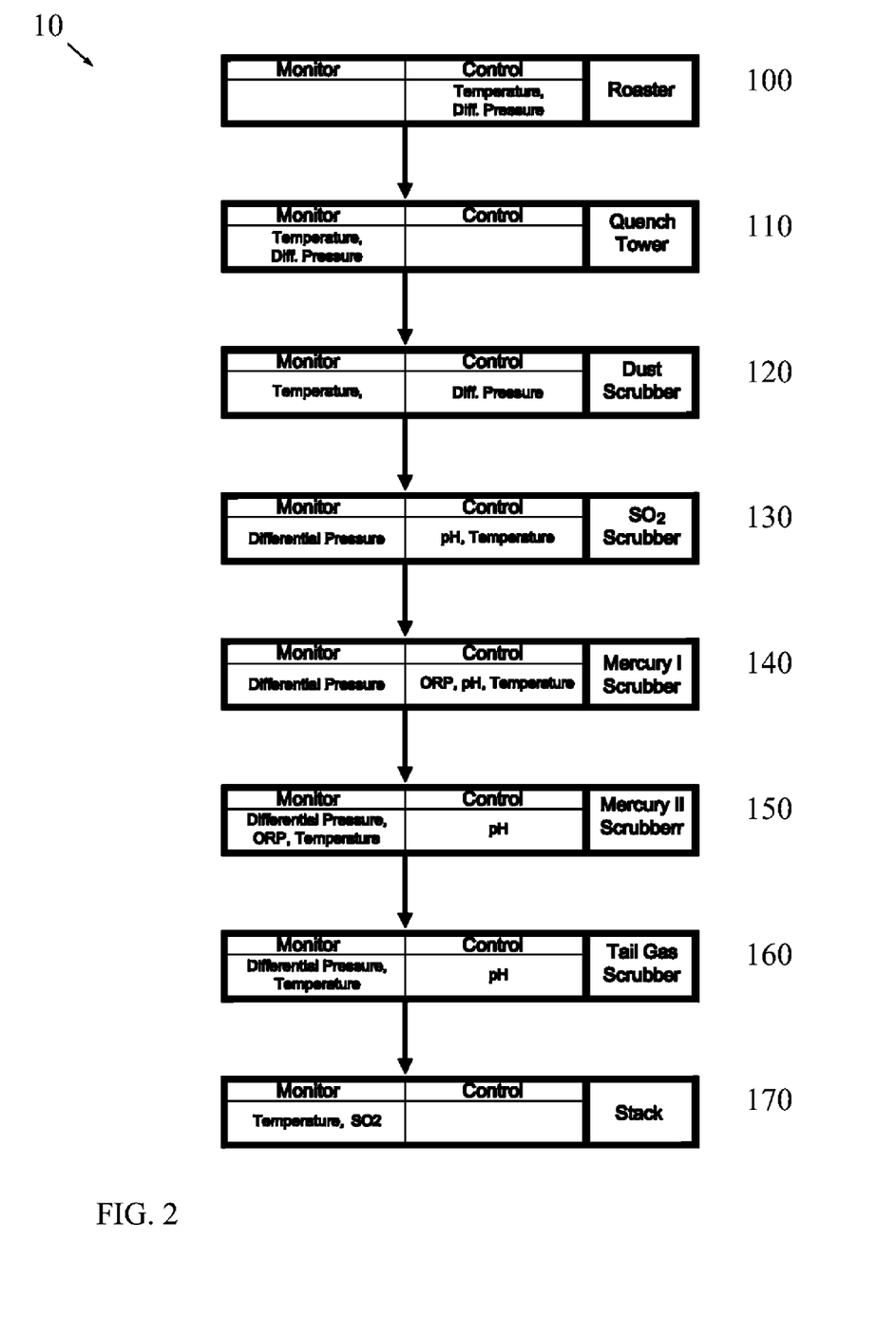
FIG. 2 is a flow diagram of an embodiment showing monitoring and control functions at each stage.
Figure 3:
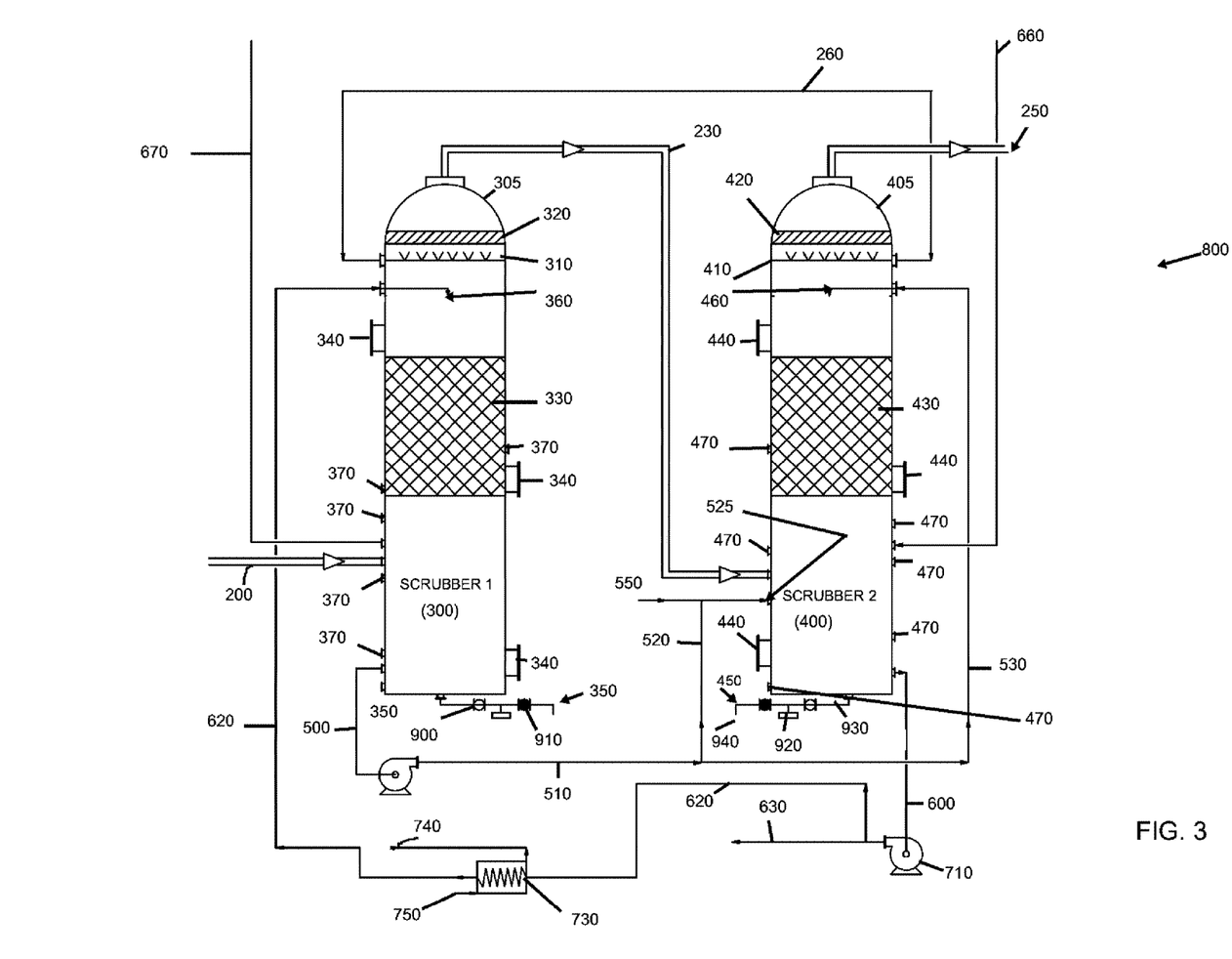
FIG. 3. is a schematic diagram of mercury scrubbers of an embodiment.

A first embodiment is described with general reference to FIGS. 1, 2 and 3 and comprises a method and apparatus for removing mercury from a gas, which may be an off gas and may be generated by ore roasting. In an embodiment the ore may be gold ore. The embodiment is further illustrated in detail in an example presented below.

The overall process is generally designated 10 and may comprise a number of steps, each of which may be associated with a designated portion of an apparatus as illustrated more particularly in FIGS. 1 and 2.

In a first step designated 100 a gas to be treated, which may be an off gas may be produced by ore roasting and may be at high temperature. The gas to be treated may be cooled (110) using water sprays, heat exchangers, refrigeration systems or any other suitable means, and such cooling may occur in a quench tower and in particular embodiments may result in a gas with a temperature below about 65° C., 60° C., 55° C., 50° C., 45° C., 40° C., 35° C., 30° C. or lower than about 30 C, or above one of the foregoing temperatures. Following passage through the quench tower particulates may be removed (120) in a dust scrubber, wet scrubber or other suitable device to remove particulate matter. Suitable alternative devices may include cyclones, filters, dust separators, and the like and particulates may also be removed by forming a water slurry which may then be further processed to remove gold or other desirable constituents. In embodiments the gas leaving the dust scrubber may have a further reduced temperature and may be cooler than about 50° C., 45° C., 40° C., 35° C., 30° C., 25° C., 20° C. or less.

Sulphur dioxide may be removed (130) in a sulphur dioxide scrubber. This may be achieved by water or alkali scrubbing; and may be accomplished using a packed tower scrubber using soda ash addition to control pH. It may be important to remove $SO_2$ from the gas stream prior to oxidation of the mercury, since $SO_2$ may act as a reducing agent and will interfere with the proper operation of the mercury scrubber. After removal of sulphur dioxide the gas pressure may be increased, for instance by a draft fan, and the pressure may be raised to greater than about 2 pounds per square inch (psi), 2.5 psi, 3.0 psi, 3.5 psi, 4.0 psi, or more. Within the $SO_2$ removal stage 120 both pH and temperature may be regulated The removal of mercury may be achieved by reacting the mercury with dissolved chlorine gas in a first scrubbing step 140. As will be seen from FIG. 3 this may be accomplished using a first mercury scrubber 300 also referred to as mercury scrubber (I) or mercury scrubber 1, to form mercuric chloride ($HgCl_2$). In mercury scrubber (I) mercury may be absorbed or adsorbed onto a solution/gas interface and two reactions may occur:

$$Hg^0 + Cl_2 \rightarrow Hg^{2+} + 2Cl^-  \qquad A.$$

and $$Hg^0 + Hg^{2+} + 2Cl^- \rightarrow Hg_2Cl_2; \qquad B.$$

the $Hg^{2+}$ ions partition into the scrubbing solution and $Hg_2Cl_2$ (calomel or mercurous chloride) precipitate may form.

The chlorine solution may also contain dilute soda ash to control the pH and may further contain mercuric chloride for reacting with mercury ions that may be present in the gas or may be generated by the reaction of elemental mercury in the gas with molecular chlorine.

Any remaining unreacted mercury may be removed in a second mercury scrubbing step 150 in mercury scrubber (II), also referred to as mercury scrubber 2, by reaction with dissolved mercuric chloride, or dissolved mercuric chloride and chlorine gas. Again the pH of the solution may be adjusted by the addition of soda ash.

FIG. 3 is a schematic diagram of the structure and relationship of the two mercury scrubbers of the first embodiment. The assembly comprising the two scrubbers is generally designated 800. Scrubber (I) 300, and scrubber (II) 400 may be of similar construction. Each of the scrubbers is fed with seepage or fresh water by a water supply 260.

Scrubber (I) comprises a containing wall 305, a demister spray 310, a demister screen 320, a packed bed 330, and a mercury collection assembly 350. A number of access points 340 are provided. Soda ash is fed into scrubber (I) 300 through a soda ash feed 670 as necessary to maintain the desired pH, and chlorine gas is injected into the circuit (550) in response to monitoring by an ORP probe and liquid mercury is harvested in mercury collection assembly 350. Scrubber (II) comprises a containing wall 405, a demister 410 spray, a demister screen 420, a packed bed 430, and a mercury collection assembly 450. A number of access points 440 are provided. Soda ash solution is injected into scrubber (II) 400 through soda ash feed 660 as necessary to maintain the desired pH. A number of probe insertion points 370 are provided for probe insertion into scrubber (I) and a number of probe insertion points 470 are provided in scrubber (II) and may be used to monitor pH, temperature, ORP and other parameters as desired.

Gas to be treated is delivered to scrubber (I) 300 by ducting 200, and following passage through the scrubber is conveyed to scrubber (II) 400 through ducting 230. After passage through scrubber (II) 400 the treated gas is passed on to a tails gas scrubber in ducting 250.

Chlorine solution is fed to the scrubbers through an ORP (oxidation reduction potential) circuit. The ORP circuit comprises a line 500 leading accumulated scrubber solution from scrubber (I) to a pump 726, and thence to a line 510 carrying solution from the pump. Line 510 splits into a line 530 and a line 520. Line 530 flows to an injection point 460 in scrubber (II) 400 for mixing the scrubber solution with the off gas. Line 520 feeds into the lower portion of scrubber (II) at an infeed 525, and it is at this point in the circuit that the composition of the recirculating scrubber solution is adjusted by the addition of chlorine as necessary at an injection point 550. This feature is also referred to as a chlorine regeneration system, or a scrubber solution regeneration system, and indicates or may indicate a system or systems whereby the scrubber solution or solutions may be continuously regenerated to permit continued recirculation of scrubber solution within or between the two scrubbers. Scrubber solution from scrubber (II) 400 is led off through a line 600, leading to a pump 710 which feeds into line 620 to convey the scrubber solution to a heat exchanger 730, and into a scrubber solution bleed line 630. From heat exchanger 730 line 620 leads recycled scrubber solution to an injection point 360 in scrubber (I) 300. A cooling water input 630 and output 640 are provided for the heat exchanger.

Mercury collection assemblies 350 and 450 serve to collect any liquid mercury accumulating in the base of the scrubbers. They comprise two valves 900, 910, and a mercury collector vessel 920. In operation valve 900 is normally open and valve 910 closed, mercury drains through pipes 930 and collects in vessel 920. When desired valve 900 is closed and valve 910 is opened to allow flow through outlet pipe 940 and the mercury is collected from the vessel 920. Then valve 910 can be closed again, and valve 900 reopened and collection continued. As indicated above, where mercury is absorbed or adsorbed or otherwise contacts a solution containing mercuric chloride or other $Hg^{2+}$ salts, the reaction $Hg^0 + Hg^{2+} \rightarrow Hg_2Cl_2$ is believed to occur resulting in the precipitation of $Hg_2Cl_2$ (Calomel).

The scrubber solutions containing dissolved chlorine and/or mercuric chloride may be recycled between the scrubbers 300 and 400 and regenerated as necessary to continue the scrubbing process and in embodiments this recycling and regenerating may be achieved substantially continuously. As desired or as necessary to drive the reactions, precipitating mecurous chloride may be removed from the solution; and mercuric chloride may be regenerated as necessary to run the process.

In particular embodiments the scrubber solution and the gas to be treated may contact each other at a gas/liquid interface and the reaction may comprise forming a 2-dimensional mercury vapour at the gas/liquid interface. The mercuric chloride ($HgCl_2$) may then dissolve into the solution and may further react with mercury in the gas to form mercurous chloride (calomel, $Hg_2Cl_2$) which can be removed by precipitation.

As will be seen from FIG. 2, during passage through the first mercury removal stage (in mercury scrubber (I)) (140) pH, ORP and temperature may be regulated and during passage through the second mercury scrubber stage (150) pH may be regulated.

In embodiments the reaction between the mercury and chlorine may be carried out at a temperature of less than about 100° C., 95° C., 90° C., 85° C., 80° C., 75° C., 70° C., 65° C., 60° C., 55° C., 50° C., 45° C., 40° C., 35° C., 30° C. or lower. The reaction may occur in the absence of an added catalyst and in particular embodiments may be conducted at a temperature of less than about 65° C. It is believed that in embodiments, while the reaction may still occur at detectable levels at temperatures substantially above 65 C, the efficiency or effectiveness of the reaction may decrease at higher temperatures.

In embodiments the pH of the chlorine solution in mercury scrubber(I) may be optimised to promote the reaction between elemental mercury and dissolved chlorine gas. The chlorine solution may also contain mercuric chloride and may contain a pH adjusting agent such as soda ash. In embodiments the pH of the chlorine solution in mercury scrubber (I) may be between about 6 and 8, and may be between about 6.5 and 7.5 and may be between about 6.7 and 7.2 and may be between about 6.8 and 7.0 and in particular embodiments may be about 6.9. Suitable adjustments to temperature, pressure, pH and other parameters to optimise the reaction for desired purposes will be readily recognised and made by those skilled in the art.

In embodiments the ORP of the scrubber solution in mercury scrubber (I) may be maintained at above about 600 mV, above about 700 mV, above about 800 mV, above about 900 mV, about 1000 mV, above about 1100 mV, above about 1200 mV or higher and in particular embodiments may be maintained at at least approximately 900 mV. In embodiments the reaction occurs at an ORP between about 500 mV and about 2000 mV. In embodiments mercuric chloride levels may be maintained at levels of between about 500 ppm to 2000 ppm, and in embodiments may be below about 500 ppm, may be between about 500 ppm and about 1000 ppm, between about 1000 ppm and about 1500 ppm, between about 1500 ppm and about 2000 ppm, between about 2000 ppm and about 2500 ppm or may be above about 2500 ppm.

In embodiments the pH of the mercuric chloride solution in mercury scrubber (II) may be between about 7 and about 9, may be between about 7.5 and 8.5 and may be about 8 and in embodiments the solution may also contain dissolved chlorine and may contain a pH adjusting agents which may be or may include soda ash.

It will be appreciated that the reaction conditions in mercury scrubber (II) and mercury scrubber (II) may be similar, except that by the time the gas reaches mercury scrubber (II) the bulk of the mercury in the gas will or may already have reacted with chlorine and/or mercury chloride in mercury scrubber (I). Thus the conditions in scrubber (I) are adjusted to favour Reaction A, between chlorine and mercury, and in mercury scrubber (II) they are adjusted to more directly favour the reaction between mercury and mercuric chloride to form mercurous chloride. Those skilled in the art, with the guidance provided herein, will readily adjust the conditions in such scrubbers to promote the desired reactions.

Following the mercury removal step or steps, the processed gas to be treated may be further polished (160) in a tails gas scrubber which serves as a backup cleaning device to remove any contaminants not caught by the previous steps. It may contain plastic packing rather than titanium packing. Operationally, it will act and serve as a "buffer" to absorb soluble gaseous components not fully captured in the mercury scrubbers. Soda ash (Sodium Carbonate) may be added as necessary for pH control. Following treatment the gas may be released to the atmosphere (170).

In particular embodiments, after processing using the methods and apparatuses disclosed herein the treated gas may comprise substantially reduced levels of mercury. In embodiments the treated gas may contain less than about 10 $ug/m^3$ of mercury, or less than about 9 $ug/m^3$ of mercury, or less than about 7 $ug/m^3$ of mercury, or less than about 8 $ug/m^3$ of mercury or less than about 6 $ug/m^3$ of mercury, or less than about 5 $ug/m^3$ of mercury or less than about 4 $ug/m^3$ of mercury, or less than about 3 $ug/m^3$ of mercury or less than about 2 $ug/m^3$ of mercury, or less than about 1 $ug/m^3$ of mercury or less.

In embodiments, at any given gaseous concentration of mercury, the rate at which mercury is removed from the gas may be dependent on the concentration of mercury on the adsorbing or absorbing surface. This may depend on: the surface area available for adsorption by the mercury, the temperature of the liquid solution interface, and the rate at which mercury is oxidized or reacts with the chlorine and/or mercuric chloride solution and is removed from the surface. The flow rates and compositions of the chlorine, and mercuric chloride solutions may be controlled by feedback from one or more ORP (oxidation-reduction potential) probes provided in the relevant feed lines as will be readily understood by those skilled in the art. Similarly pH controllers may be used to control the flow of soda ash or any suitable equivalent, in order to maintain the pH of a solution at or near its desired value.

In embodiments the chlorine solution and/or the mercuric chloride solution may be regenerated and/or recycled within or between one or both of mercury scrubbers (I) and (II) and in embodiments the scrubber solution may be recycled in a continuous flow system between the two scrubbers.

It will be understood that in embodiments the sequence of steps disclosed may be modified, particular steps may be repeated one, two, three, four or more times, certain steps may be omitted and other modifications may be made by those skilled in the art without departing from the scope and spirit of the subject matter hereof.

Mercury Scrubbers.

It is believed that the adsorption of mercury atoms at the gas solution interface may be an important step in the reaction process because it permits the two reactions necessary for the removal of the mercury from the system as the insoluble product mercurous chloride (calomel), namely the reaction of molecular chlorine with Hg, followed by the reaction of native Hg with $HgCl_2$ to form $Hg_2Cl_2$. The constant removal of mercuric ions from solution by the formation of calomel may be offset by the oxidation of elemental mercury at the gas solution interface by dissolved chlorine gas. mercury scrubber (I), downstream of the $SO_2$ scrubber, is used as both a reactor and a scrubber in the process.

Chlorine gas is injected into the scrubber liquid to both oxidize the $Hg^0$ to $Hg^{+2}$ at the gas/solution interface and to provide the chloride ion needed for the $Hg^{+2}$ to form soluble $HgCl_2$. Soda ash (Sodium Carbonate) is also added to the mercury scrubber as needed to control pH. In embodiments it has been found that a pH of around 6.9 may be suitable to promote the reaction of molecular chorine with mercury. The reaction between mercury and chlorine in mercury scrubber (I) thus requires a different set point for pH than either the $SO_2$ scrubber or mercury scrubber (II) where the predominant reaction is that between $Hg^0 + Hg^{2+} \rightarrow Hg_2Cl_2$;

Process Optimization

The rate of mercury removal in this system is shown by the following equation:

$$-dC_{Hg}/dt = K \cdot A \cdot f(p) \cdot f(T)$$

where:
p=partial pressure of mercury in the off gas
K=a constant
A=the surface area of the solution
T=the temperature of the gas liquid interface At any one temperature the adsorption of mercury atoms at the gas solution interface may be governed by a form of the Langmuir adsorption isotherm which in its simplest form approximates to:

$$\theta = \alpha \cdot p / (1 + \alpha \cdot p)$$

where:
p=partial pressure of mercury in the off gas
α=a constant
θ=fractional coverage of the surface It will be apparent that the following parameters may significantly affect the reaction: the pH of the solution; the ORP value of the solution; the concentration of mercuric ions in the solution; the concentration of chlorine in solution; the concentration of sulfur dioxide in solution; and the concentration of chloride in solution.

In a general embodiment there are provided two separate scrubbers carrying out two different functions. Each has different optimization parameters.

In the first scrubber, mercury scrubber (I), both Reaction A ($Hg^0 + Cl_2 \rightarrow HgCl_2$) and Reaction B ($Hg^0 + HgCl_2 \rightarrow Hg_2Cl_2$) occur. Both Reactions A and B will control the mercury concentration in the gas and will assist in keeping the level of mercuric ions where they need to be, in the solution, to provide the measure of control to produce the desired reduction in the mercury vapor pressure in the gas.

In mercury scrubber (I) the parameters to maximize Reaction (A):

$Hg^0 + Cl_2 \rightarrow HgCl_2$ are more critical

In the second scrubber, mercury scrubber (II), the Reaction (B):

$Hg^0 + HgCl_2 \rightarrow Hg_2Cl_2$ is promoted, the creation of Calomel by the oxidation of the remaining mercury vapor with mercuric chloride to produce insoluble mercurous chloride (calomel).

Since the primary objective of mercury scrubber (II) is to convert elemental insoluble mercury into its oxidized insoluble form ($Hg_2Cl_2$), removing it from the gas stream, the scrubber's performance is increased when the concentration of the mercuric chloride in the bulk solution is sufficient to create an effective concentration of atomic mercury, across the boundary layer, of zero.

ALTERNATIVE EMBODIMENTS

In a second series of embodiments there is disclosed a method for cleaning a gas, which may be a flue gas from ore roasting or other processes. The method may comprise removing mercury from the gas, and this may be achieved by oxidising mercury with a solution of chlorine gas. In an alternative embodiment of the second embodiment, there is disclosed a method for removing mercury from a gas wherein the improvement comprises reacting said mercury with chlorine gas to form $HgCl_2$. In alternative embodiments the chlorine gas may be in aqueous solution and the method may further comprise reacting said mercury with said $HgCl_2$ to form $Hg_2Cl_2$. In a further embodiment there is disclosed a method for removing mercury from a gas wherein the improvement comprises reacting said mercury with dissolved chlorine gas, which reacting may occur at a gas liquid interface.

In a further series of embodiments there is disclosed an apparatus for implementing the other embodiments. The apparatus may comprise a first mercury scrubber for reacting said mercury with a solution of chlorine gas to generate $HgCl_2$. In further embodiment the apparatus may further comprise a second mercury scrubber for reacting the mercury with a solution of $HgCl_2$ and generating $Hg_2Cl_2$. In a further embodiment the apparatus may comprise a precipitator or harvester to remove precipitated $Hg_2Cl_2$.

In a further embodiment there is disclosed a mercury scrubber wherein the improvement comprises a reactor for reacting the gas to be treated with a chlorine solution and wherein a further improvement comprises precipitating mercurous chloride.

In an embodiment there is disclosed a method for removing mercury from a gas, the method comprising reacting the mercury with chlorine gas to form mercuric chloride. In alternative embodiments the chlorine gas and the formed mercuric chloride are in aqueous solution. In embodiments the solution and the gas may form a gas/liquid interface and the reacting may further comprise forming a 2-dimensional mercury vapour at said gas/liquid interface. In embodiments the reacting occurs at a temperature of less than about 100° C. In embodiment the method further comprises the step of reacting any unreacted mercury with the mercuric chloride to form mercurous chloride and may comprise the step of removing the mercurous chloride from the solution. In embodiments the chlorine solution is at a pH of between about 6.5 and about 7.5 and in embodiments the gas may be an off gas.

In an embodiment there is disclosed an apparatus for removing mercury from a gas, wherein the improvement comprises a first mercury scrubber for reacting the mercury with a chlorine solution. In embodiments the apparatus may comprise a chlorine feed system for regenerating the chlorine solution. In embodiments the improvement further comprises a second mercury scrubber and a circulation system suitable to substantially continuously recirculate the chlorine solution between the two said scrubbers. In embodiments the apparatus further comprises a harvester for harvesting precipitated mercurous chloride generated in the scrubber.

In embodiments there is disclosed a method for removing mercury from a gas wherein the improvement comprises reacting the mercury with a solution of chlorine gas to form mercuric chloride in solution. In embodiments the method comprises reacting the unreacted mercury with the mercuric chloride to form mercurous chloride. In embodiments the method further comprises the step of removing the mercurous chloride from the solution. In embodiments the solution and gas form a gas/liquid interface and said reacting further comprises forming a 2-dimensional mercury vapour at said gas/liquid interface. In embodiments the reaction of mercury with said solution of chlorine gas occurs in a first scrubber and said reaction of mercury with mercuric chloride occurs in a second scrubber. In embodiments the method is carried out at a temperature of less than about 65 C or less than about 40 C. In embodiments the reaction between the chlorine and the mercury occurs under an ORP of between about 500 mV and about 2000 mV.

More generally, there is disclosed a method for removing mercury in off gases, in which the adsorbed mercury on the surface of the scrubber solution reacts with the oxidizing agent in the scrubber solution and is absorbed into the solution where the presence of the same oxidizing agent prevents it from being reduced into a elemental mercury by the action of $SO_2$ etc. and scattered back into the off gases. The inventor has identified a method of optimising the oxidation-reduction potential (ORP) in the scrubber solution by the injection of chlorine into the scrubber solution.

The present disclosure also provides a method for removing mercury in off gases, in which mercury in exhaust gas discharged from roaster and other heat producing equipment is removed, characterized by including a mercury oxidation process in which mercury in the off gases is adsorbed onto the surface of a scrubber solution and converted to mercury chloride by the reaction with dissolved chlorine gas in the solution. The mercuric chloride is then absorbed into the solution freeing the surface to adsorb further mercury.

EXAMPLES

The following example is provided as illustrative of the first embodiment and is not limiting. In alternative embodiments one or more of the steps described may be omitted, modified or repeated or implemented in a modified sequence, all in ways that will be readily understood an applied by those skilled in the art to suit particular requirements and circumstances. It will be understood that the temperatures, and percentages presented in the example may be modified in particular embodiments. Alternative temperatures and temperature ranges will be readily recognised and implemented by those skilled in the art.

In the example described, off gas produced by the roasting of gold ore is treated to remove mercury which may be elemental mercury.

1.1 General Gas Handling Process

A gas handling circuit pulls the off-gas from the source ore roaster and processes it to remove dust particulate material, sulfur dioxide gas, other gases and mercury vapor before releasing clean gas to the atmosphere through the stack. A negative differential pressure with respect to the atmosphere may be maintained inside the system to prevent dust and gases from escaping the system. The differential pressure may be controlled by the operation of the gas handling circuit.

Hot dust-laden off-gas from the system is directed to the inlet of a gas quench tower, where it may be sprayed with water. At this point it may be cooled from its starting temperature which may be or may be above or below about 620° Centigrade (C) to a lower suitable temperature which may be about 55° C. or higher or lower, by heat loss to water evaporation and slurry heating, prior to exiting the gas quench tower. This cooling step may reduce the total gas volume and may do so by approximately 60%. The majority of the particulate matter larger than 2 microns in diameter may be captured in this water and leaves the quench tower, as dilute slurry. The size cut off may vary depending on detailed process parameters. The cooled gas stream then enters the dust scrubber where it may be sprayed with water. The bulk of the remaining larger particles are captured in this fluid stream flowing through the dust scrubber.

The cooled gas stream then passes upwards and out of the dust scrubber to the sulfur dioxide scrubber. Further heat transfer in the dust scrubber may cause the gas temperature to drop to approximately 35° C.

Following the dust scrubber, the gas may be then passed through a packed bed soda ash scrubber (the sulfur dioxide scrubber) to remove any sulfur dioxide that may be present. Next a single stage induced draft fan boosts the scrubbed gas pressure by about 3.5 pound per square inch (psi) for subsequent transfer to the mercury scrubbers (I) and (II). The mercury scrubber (I) contacts the gas with a dilute solution of soda ash for pH control, this solution also contains both dissolved chlorine gas and mercuric chloride for mercury oxidation and control. The gas stream then passes through the mercury scrubber (II) which contacts the gas with a solution of soda ash and mercuric chloride for further mercury recovery and control. The gas stream then passes to the tail gas scrubber as a final cleaning, and may be discharged to the atmosphere through the stack.

1.2 Gas Quench Tower

Hot gas (620° C.) from the system may be routed through a stainless steel duct to the inlet at the top of the gas quench tower. A gas inlet nozzle projects 2" through the lid to maintain a sharp temperature transition into the tower, which minimizes corrosion and solids buildup on the inlet nozzle. As the hot gas passes through the inlet nozzle, four water spray nozzles quench the gas stream. These nozzle assemblies are located at 90° angles just below the inlet. Each 6" nozzle projects a flat spray perpendicular to the direction of the gas stream. Consequently, the gas stream may be completely surrounded by a wall of water, which penetrates the gas stream to its core.

There are 8 additional spray nozzles in the upper section of the gas quench tower that spray onto the vessel walls to minimize corrosion and solids deposition. The hot gas evaporates water and may be cooled to about 75° C. in the process. As the gas passes through the water sprays, the gas quench tower vessel diameter increases. Both the cooling and increased diameter serve to slow down the gas from the inlet.

Another water nozzle located near the bottom of the gas quench tower projects a water spray upward against the gas flow. The gas leaving the quench tower may be saturated with water at 55° C. and contains some water mist. Slurry discharging from the quench tower passes through a 3" drainpipe to a tank located directly below the quench tower.

1.3 Wet Dust Scrubber

The wet dust scrubber may be located next to the gas quench tower and may be connected to it with a short section of rectangular duct. Saturated gas from the gas quench tower, laden with mist, dust and sulfur dioxide, enters the scrubber tangentially near the bottom. The inner wall of the lower section may be protected from abrasion with a ceramic shield. Gas may be forced through the stationary vane cage in the lower section, where it may be contacted with water from the high-pressure water line. The water spray may be broken into tiny droplets by the action of the swirling gas as it passes through the vanes of the cage. The water droplets capture dust particles as the gas passes up through the scrubber. The resulting slurry may be drained from the bottom of the Entoleter scrubber to the seal tank. The gas and mist pass up into the disengaging section of the Entoleter where the water droplets are collected on the vessel walls. The cleaned gas passes out of the scrubber through the top flange and then travels down through the FRP duct (fiberglass reinforced plastic) to the sulfur dioxide scrubber.

Efficient scrubbing in the scrubber increases with increasing pressure drop. The pressure drop may be controlled by the vane cage height and, to a lesser extent, by the water flow rate. The vane cage height can be adjusted by means of an adjusting ram located in the side of the unit.

1.4 Sulfur Dioxide Scrubber

The Sulfur Dioxide scrubber uses a dilute (10%) soda ash solution to scrub sulfur dioxide from the gases leaving the wet dust scrubber. The gases pass up through a packed bed where they are contacted countercurrent with the dilute soda ash solution. Soda ash makeup to the scrubber sump may be controlled by the pH of the sump. The scrubbed gases pass through a Chevron-type mist eliminator before leaving the scrubber. The gasses move on to the induced draft fan, and the spent scrubber solution may be bled from the sump recycle line to control the sump level. Spent scrubber solution may be sent to either the effluent tank.

The recirculating soda ash solution may be cooled as it passes through a heat exchanger using cold water from the tailings seepage as the cooling medium. The intent may be to keep the temperature of the soda ash solution entering the scrubber at approximately 30° C.

1.5 Induced Draft Fan

The sulfur dioxide scrubber gas discharge feeds the induced draft fan suction and the fan discharges approximately 5,000 scfm of waste gas to the mercury scrubber. The system first stage pressure indicating controller adjusts the suction damper to the induced draft fan in order to control pressure inside the system.

Gas feed to the induced draft fan discharges from the sulfur dioxide scrubber. This waste gas may be low in $SO_2$, but may contain some sulfuric acid mist. At normal operating conditions the gas may be about 30° C. at the induced draft fan suction damper. Waste gas may be discharged from the fan at about 35° C.

1.6 Mercury Scrubbing Systems (I) and (II)

Elemental mercury in the waste gas from the induced draft fan may be scrubbed out in the mercury scrubbers (I) and (II) and the cleaned gas may be sent on to the tails gas scrubber. Waste gas from the roaster contains mercury vapor derived from mercuric compounds in the ore that oxidize within the roaster. Some of the mercury vapors are condensed in the $SO_2$ scrubber and the mercury scrubbers (I) and (II) are designed to capture the remainder.

The waste gas may be contacted in mercury scrubbers (I) and (II) countercurrent with a solution containing both dissolved chlorine gas and mercuric chloride in the 20 foot packed beds. The pH of the scrubber solutions may be controlled by addition of soda ash. A bleed stream from the mercury scrubbers' recirculation tanks, which contains both mercuric chloride in solution and a slurry of calomel, may be combined with a bleed from the sulfur dioxide scrubber and the Tails Gas scrubber. This combined bleed stream may be then treated for soluble mercury content by the addition of zinc dust to produce mercurous chloride precipitate (calomel) the precipitate may be collected and the solution sent to the effluent tank and on to tails. An automated chlorination system feeds chlorine into the line prior to the mercury scrubber (I). This chlorine reacts with the elemental mercury vapor thereby providing the mercuric ions for the mercury scrubbers (I) and (II) that may be lost to the calomel precipitate. ORP of the scrubber solution is generally maintained at approximately 900 my or higher and mercuric chloride levels are generally maintained at levels of between about 500 ppm to 2000 ppm The mercury scrubber (I) solution recycle stream may be taken from the 4" nozzle on its sump and sent to a header that feeds 3 recycle pumps. The inside pump may be the primary recycle pump for the mercury scrubber (I). The outside pump may be the primary recycle pump for mercury scrubber (II). The middle pump may be a spare, which can serve either the mercury scrubber (I) or (II). Each pump operates at 300 gpm. The 4" line from the pump discharge recycles solution from mercury scrubber (I) to one of the spray heads at the top of the tower of mercury scrubber (II). The sump level controller, of mercury scrubber (I) operates the control valve on the 1" line from the pump discharge, that discharges to the sump of mercury scrubber II, to maintain the sump level. Two pH probes and one ORP probe are in the 4" recycle line and control the addition of soda ash and chlorine gas to the system respectively.

The mercury scrubber (II) solution recycle stream may be also taken from a 4" nozzle on the sump and sent to the same header that feeds 3 recycle pumps. The inside pump may be the primary recycle pump for the mercury scrubber (I). The outside pump may be the primary recycle pump for mercury scrubber (II). The middle pump may be a spare, which can serve either the mercury scrubber (I) or (II). Each pump operates at 300 gpm. The 4" line from the pump discharge recycles solution from mercury scrubber (II) to one of the spray heads at the top of the tower of mercury scrubber (I). The sump level controller, of mercury scrubber (II) operates the bleed control valve on the 1" line from the pump discharge, which discharges to the bleed collection tank, to maintain the sump level.

Chlorine gas may be injected into the sump of mercury scrubber (II) to be fed to the spray nozzles at the top of mercury scrubber (I). The amount of chlorine gas injected to the sump of mercury scrubber (II) to be fed to the spray nozzles at the top of mercury scrubber (I) may be controlled by an automatic valve and the flow rate adjusted by the reading of the ORP probe in the feed line to the mercury scrubber (II) spray nozzles.

Soda ash may be fed to the mercury scrubber sumps from a 10% soda ash makeup tank. The soda ash makeup rate may be controlled by the pH controller set at pH 8.0. Waste gas may be discharged from the mercury scrubbers at 85° F./30° C.

1.7 Tails Gas Scrubbing System

The tails gas scrubber acts as a final polishing device. The tail gas scrubber may be a 25 foot tall packed tower, 6 foot in diameter with stainless steel walls. The tower has a 600-gallon sump, and 8" Chevron-type 4-pass mist eliminator with a water spray, and one spray head for solution recycle. The tower may be rated at 6 psig pressure and 100 inches of water column vacuum. Water may be piped to the mist eliminator spray on the tail gas scrubber. The flow rate may be controlled by a ball valve and may be monitored locally. Soda ash may be fed to the tail gas scrubber sump under the control of the pH controller. A high pH alarm may be included in this controller to warn of high pH conditions, which can result in plugging of the packed bed due to sodium bicarbonate scale formation on the packing.

The embodiments and examples presented herein are illustrative of the general nature of the subject matter claimed and are not limiting. It will be understood by those skilled in the art how these embodiments can be readily modified and/or adapted for various applications and in various ways without departing from the spirit and scope of the subject matter claimed. The claims hereof are to be understood to include without limitation all alternative embodiments and equivalents of the subject matter hereof. Phrases, words and terms employed herein are illustrative and are not limiting. Where permissible by law, all references cited herein are incorporated by reference in their entirety. It will be appreciated that any aspects of the different embodiments disclosed herein may be combined in a range of possible alternative embodiments, and alternative combinations of features, all of which varied combinations of features are to be understood to form a part of the subject matter claimed. Particular embodiments may alternatively comprise or consist of or exclude any one or more of the elements disclosed.

The embodiments of the invention in which an exclusive property or privilege is claimed are defined as follows:

1. A method for removing mercury from a first gas, the method comprising
reacting said mercury with an aqueous solution of dissolved chlorine gas to form an aqueous solution comprising $HgCl_2$ in a first scrubber at a pH of between 6.5 to 7.5; and
reacting any unreacted mercury with the $HgCl_2$ to form $Hg_2Cl_2$ in a second scrubber at a pH of between 7.5 to 8.5.

2. The method according to claim 1, wherein said solution of dissolved chlorine gas and said first gas form a gas/liquid interface and said reacting further comprises forming a 2-dimensional mercury vapour at said gas/liquid interface.

3. The method according to claim 1, wherein the reacting occurs at a temperature of less than about 65° C.

4. The method according to claim 1 further comprising removing the mercurous chloride from the solution.

5. The method according to claim 1, wherein the first gas is an off gas.

6. The method according to claim 1, wherein the reaction of the mercury with the chlorine in the aqueous solution occurs under an oxidation reduction potential (ORP) of between 500 mV and 2000 mV.

7. The method according to claim 1, for forming a 2-dimensional mercury vapour at a gas/liquid interface, the method comprising reacting a mercury laden gas with an aqueous solution of dissolved chlorine gas, wherein the aqueous chlorine solution is at a pH of between 6.5 to 7.5.

8. The method according to claim 7, wherein the reacting occurs at a temperature of less than 65° C.

* * * * *